United States Patent
Denesuk

(10) Patent No.: US 6,756,428 B2
(45) Date of Patent: Jun. 29, 2004

(54) DEGRADABLE PLASTICS POSSESSING A MICROBE-INHIBITING QUALITY

(75) Inventor: Matthew Denesuk, San Jose, CA (US)

(73) Assignee: Seefar Technologies, Incorporated, Tucson, AZ (US)

(*) Notice: Subject to any disclaimer, the term of this patent is extended or adjusted under 35 U.S.C. 154(b) by 0 days.

(21) Appl. No.: 10/249,049

(22) Filed: Mar. 12, 2003

(65) Prior Publication Data

US 2003/0139491 A1 Jul. 24, 2003

Related U.S. Application Data

(63) Continuation of application No. 09/513,703, filed on Feb. 25, 2000, now Pat. No. 6,566,419.
(60) Provisional application No. 60/121,659, filed on Feb. 25, 1999.

(51) Int. Cl.[7] .............................. C08J 9/00; C08K 5/00

(52) U.S. Cl. ........................ 524/47; 521/50; 521/142; 523/100; 523/122; 523/128; 424/404; 424/408; 424/413

(58) Field of Search .................. 521/50, 142; 523/100, 523/122, 128; 524/47, 52, 53; 424/404, 408, 413

(56) References Cited

U.S. PATENT DOCUMENTS

| | | | |
|---|---|---|---|
| 3,624,062 A | | 11/1971 | Dunbar |
| 4,789,692 A | | 12/1988 | Rei et al. |
| 5,321,064 A | * | 6/1994 | Vaidya et al. ................ 524/56 |
| 5,339,771 A | | 8/1994 | Axelrod |
| 5,360,830 A | | 11/1994 | Bastiolie et al. |
| 5,407,661 A | | 4/1995 | Simone et al. |
| 5,409,973 A | | 4/1995 | Bastioli et al. |
| 5,419,283 A | | 5/1995 | Leo |
| 5,459,258 A | | 10/1995 | Merrill et al. |
| 5,485,809 A | | 1/1996 | Carroll |
| 5,554,373 A | | 9/1996 | Seabrook et al. |
| 5,744,516 A | | 4/1998 | Hashitani et al. |
| 5,845,769 A | | 12/1998 | Yeager |
| 5,868,933 A | | 2/1999 | Patrick et al. |
| 5,885,543 A | | 3/1999 | Klatte |
| 6,566,419 B2 | * | 5/2003 | Denesuk ..................... 523/122 |

* cited by examiner

*Primary Examiner*—Kriellion A. Sanders
(74) *Attorney, Agent, or Firm*—McGarry Bair PC

(57) ABSTRACT

A microbe-inhibiting (MI) compound is incorporated into a biodegradable polymer composition most preferably, a starch-based polymer, to inhibit microbial growth and to attenuate the biodegradation of the polymer composition. Such a composition is used to manufacture any of a number of articles, particularly those that come in contact with foods such as foam containers and fruit shock absorber nets as well as packing materials such as loose fill pellets.

23 Claims, No Drawings

DEGRADABLE PLASTICS POSSESSING A MICROBE-INHIBITING QUALITY

CROSS REFERENCE TO RELATED APPLICATIONS

This application is a continuation of U.S. patent application Ser. No. 09/513,703, filed Feb. 25, 2000 now U.S. Pat. No. 6,566,419, which claims the benefit of provisional patent application Ser. No. 60/121,659, filed Feb. 25, 1999.

BACKGROUND OF INVENTION

1. Field of the Invention

This invention relates to biodegradable polymers and articles manufactured therefrom, which polymers include a microbe-inhibiting agent.

2. Description of the Related Art

Degradable polymers have found applications in diverse areas such as garbage bags, golf tees, food containers, foamed packing materials, chewing articles for pets, and even writing pens. Degradable polymers can be chosen for an application for many different reasons, including their tendency to break down under appropriate biological or disposal conditions, their ability to serve as a digestible or otherwise harmless mastication material for people or animals, or for public relations purposes.

A common class of biodegradable polymers is starch-based. Pure starch polymers do not possess the desired properties for most applications, as they are brittle and are unduly affected by moisture. They are therefore commonly blended and/or reacted with other polymers. U.S. Pat. No. 5,321,064 discloses a class of biodegradable polymers in which starch is reacted with synthetic polymeric material such as polyethylene, polystyrene, polypropylene and polyvinyl chloride. U.S. Pat. No. 5,409,973 discloses a class of materials based on starch and an ethylene copolymer. U.S. Pat. No. 5,360,830 discloses a similar material produced in expanded form. U.S. Pat. No. 5,459,258 discloses a class of biodegradable materials based on the combination of hydrophobic polysaccharides, one thermoplastic and the other non-thermoplastic.

Biodegradable starch-based resins are available commercially from a number of manufacturers, such as Starchtech™ and Novamont™. Starchtech™ sells a series of such polymers under the "Re-NEW™" trade name. Novamont™ offers several classes of such polymers under the trade name, "Mater-Bi™."

Biodegradable poly(lactic acid) (PLA) and poly(glycolic acid) (PGA) resins, as well as PLA-PGA copolymers have numerous desirable properties. (See: Ratner, B D et al., Eds., *Biomaterials Science*, Academic Press, New York, 1996, p. 64; Naitove, M., *Plastics Technology*, March 1995, p. 15.) A variety of commercial grades are available from Cargill, under the name "EcoPLA™," and also from various bio-medical suppliers. Adjustment of the PGA:PLA ratio in a material can be used to fine-tune the texture, degree of hydrophilicity and rate of biodegradation. For example, PGA is more hydrophilic than PLA, so that increasing the PGA content will increase the hygroscopic property (uptake of water, saliva, or any other fluid). In addition, although PGA is highly crystalline, which generally slows its degradation, it becomes markedly less crystalline, and more degradable, when blended with PLA.

Materials based on polyhydroxybutyrate (PHB) are also attractive. One example, available commercially under the name Biopol™ comprises a blend with 3-hydroxyvaleric acid (PHV). PHB is generally highly crystalline, inflexible, and difficult to process. Blending with PHV diminishes the crystallinity, resulting in more flexible, more easily processed materials.

Polycaprolactone, either pure or blended with other materials, is a generally attractive degradable material that has found uses in medical applications such as sealing materials for wounds.

Other attractive degradable materials include, the poly (amino acids), the polyanhydrides, poly (ortho esters), and polyphosphazenes.

The mechanism by which the materials of interest are degraded typically involves the metabolic or digestive action of microbes or enzymes generally derived from those microbes breaking down the molecular structure or catalyzing the hydrolysis of the materials. In many cases, however, significant hydrolysis occurs in the absence of direct microbial or enzymatic action.

The deliberate exposure of degradable materials to microbial or digestive conditions, such as in composting or mastication, is expected to bring about their relatively rapid degradation. Unfortunately, however, such materials are naturally susceptible to microbial action over their entire lifetime. Articles constructed from biodegradable materials therefore may support microbial growth long before they are degraded or otherwise consumed. Biodegradable materials often readily absorb water which generally promotes microbial growth. This property may be a serious problem for materials requiring prolonged storage, especially if the storage environment is humid or otherwise encourages growth of fungi or bacteria (e.g., dark, poor ventilation, dirt, etc. ). This is an especially serious problem for materials that are particularly intolerant of microbial proliferation, such as materials designed to contact food. Examples of the latter include plastic cutlery and tableware, plastic or paper/plastic composite cups, plastic or paper/plastic composite food containers, etc. Items the use of which involves contact with warm, dirty, and/or humid conditions are also particularly at risk, such as chewing articles for pets.

U.S. Pat. No. 5,744,516 discloses biodegradable resin molded articles made from biodegradable resin raw material, a biodegradable additive and an additive made of a substance existing in the nature. Also disclosed are (a) injection molded articles made of a biodegradable resin and an anti-biotic substance, and (b) resin molded articles having a layer of a biodegradable resin, and a layer of a photolytic resin covering the resin layer and also containing an antibiotic. This document states that prolonged use of a biodegradable resin requires first that degradation by bacteria be restricted, as by adding an antibiotic to the resin (citing Japanese Unexamined Patent Publication (Kokai) No. 5-51073).

It is often desirable to fine-tune (or even to reduce markedly) the degree of biodegradability of a polymer. For blended or reacted biodegradable polymers, this can be accomplished by altering the proportion of, and/or degree of, reaction with the degree of branching, cross-linking, etc.) can be varied or a protective coating added. These techniques for adjusting the degree of biodegradability, however, suffer from the fact that they often require complex engineering and can have unwanted side effects on useful properties (e.g., strength, impact resistance, processability, UV- or heat-resistance, etc.). There is thus a need for a simple way to alter the degree of biodegradability of a polymer without affecting other desirable properties.

SUMMARY OF INVENTION

The present invention provides a simple approach to altering the biodegradability of a polymer without affecting other properties and thereby overcomes the shortcoming of the prior art.

The invention provides compositions and methods that incorporate an effective amount of a microbe-inhibiting (MI) compound or cocktail of compounds (all of which are referred to herein interchangeably as "compound" or "agent") into a biodegradable polymer, most preferably, starch-based polymers. The starch can be complexed with synthetic organic polymeric materials such as polyethylene, polypropylene and copolymers of ethylene and propylene. The synthetic polymers are preferably linked to the starch by organic linkers such as maleic anhydride. Such polymers linkers are described in U.S. Pat. 5,321,064, which is incorporated herein by reference. This patent discloses a class of biodegradable polymers in which starch is reacted with synthetic polymeric material such as polyethylene. Although post-incorporation of the agent can be effective (e.g., via soaking or high-pressure impregnation), it is preferred to incorporate the agent into the structure of the polymer at the time of compounding or at the time of formation (e.g., molding) of the final polymer article.

According to one embodiment of the invention, a formed body in the shape of a useful article comprises a biodegradable polymer composition including a host polymer that has incorporated therein an effective amount of a microbe-inhibiting compound or compounds which inhibit the growth of microbes in or on the useful articles. The microbe-inhibiting compound or compounds are selected from the group consisting of diiodomethyl-p-tolylsulphone; 2,4,4'-trichloro-2-hydroxydiphenylether; 10,10-oxy-bis-phenoxarsin; N-trichloromethylthio-4-cyclohexene-1,2-dicarboximide; a zinc complex of pyrithiione termed zinc omadine; silver hydroxyapatite: 2-N-octyl-4-isothiazolin-3-one; copper-bis-(8-hydroxyquinolline); N-(trichloromethyl-thio)phthalimide; and natural microbe-inhibiting compounds.

In one embodiment, the polymer composition comprises starch.

In another embodiment, the formed body is a foamed container. In a preferred embodiment, the formed body is a loose fill packing pellet.

Further according to the invention, a foamed body in the shape of a useful article comprises a biodegradable polymer composition including a matrix polymer containing a microbe-inhibiting compound or compounds which inhibit the growth of microbes in or on the useful articles, wherein the microbe-inhibiting compound or compounds are inhibiting to at least two classes of microbial agents selected form fungi, bacteria, algae, protozoa and microscopic parasitic organisms. In one embodiment, the polymer composition comprises starch. In another embodiment, the foamed body is a foamed container. In another embodiment, the foamed body is a loose fill packing pellet.

Still further according to the invention, a foamed body formed in the shape of a useful article comprises a biodegradable polymer composition comprising a host polymer that has incorporated therein an effective amount of a microbe-inhibiting compound that inhibits the growth of microbes in or on the articles, wherein the microbe-inhibiting compound is a cocktail of anti-microbial agents and where the polymer composition is formed into a foamed body. In one embodiment, the polymer composition comprises starch. In another embodiment, the foamed body is a foamed container. In yet another embodiment, the foamed body is a loose fill packing pellet.

Still further according to the invention, an organic polymer composition for forming useful articles comprises a host polymer that has incorporated therein an effective amount of a microbe-inhibiting compound that inhibits the growth of microbes in or an the articles and the microbe-inhibiting compound is a cocktail of anti-microbial agents. The organic polymer is selected from the group consisting of polyethylene, polypropylene, polystyrene and polyvinyl chloride In one embodiment, a useful article, such as a food contacting body, is formed from organic polymer composition and preferably is foamed.

Still further according to the invention, an organic polymer composition for forming useful articles comprises a host polymer that has incorporated therein an effective amount of a microbe-inhibiting compound that inhibits the growth of microbes in or on the articles. The microbe-inhibiting compound is a cocktail of anti-microbial agents and the polymer composition is a polymer blend.

Still further according to the invention, an organic polymer composition for forming useful articles comprises a matrix polymer containing a microbe-inhibiting compound or compounds which inhibit the growth of microbes in or on the useful articles. The microbe-inhibiting compound or compounds are inhibiting to at least two classes of microbial agents selected from fungi, bacteria, algae, protozoa and microscopic parasitic organisms. Further, the organic polymer comprises a polymer selected from the group consisting of polyethylene, polypropylene, polystyrene and polyvinyl chloride.

In one embodiment, a foamed body in the form of a useful article is made from this organic polymer composition. Preferably, the foamed body is a food-contacting body.

Still further according to the invention an organic polymer composition for forming useful articles comprises a matrix polymer containing a microbe-inhibiting compound or compounds which inhibit the growth of microbes in or on the useful articles. wherein the microbe-inhibiting compound or compounds are inhibiting to at least two classes of microbial agents selected from fungi, bacteria, algae, protozoa and microscopic parasitic organisms and wherein the polymer composition is a polymer blend.

Still further according to the invention a biodegradable polymer composition for forming useful articles comprises a host polymer that has incorporated therein an effective amount of a microbe-inhibiting compound or compounds which inhibit the growth of microbes in or on the useful articles. The microbe-inhibiting compound or compounds are selected from the group consisting of diiodomethyl-p-tolylsulphone; 2,4,4'-trichloro-2-hydroxydiphenylether; 10,10-oxy-bis-phenouarsin; N-trichloromethylthio-4-cyclohexene-1,2-dicarboximide; a zinc complex of pyrithiione termed zinc omadine; silver hydroxyapatite; 2-N-octyl-4-isothiazolin-3-one; copper-bis -(8-hydroxyquinolline); N-(trichloromethyl-thio)phthallmide; and natural microbe-inhibiting compounds, and the polymer is selected from the group consisting of polyethylene, polypropylene, polystyrene and polyvinyl chloride.

In one embodiment, a foamed body in the form of a useful article is made from this biodegradable polymer composition. Preferably, the foamed body is a food-contacting body.

Desirable MI agents can be obtained in various forms, e.g., as a relatively pure powder, a liquid concentrate, in a resin carrier where the carrier is one of the components of a desired blend.

For the most part, the preferred MI compounds or cocktails of compounds are effective against a broad range of microbes, particularly fungi and bacteria, and have a number of other desirable properties, including: safe at and above the concentrations required for use; degradation temperatures appreciably higher than the typical processing temperatures of the desired host plastics; when interacting with host plastic, do not lower their own degradation temperature or that of the host plastic; are readily dispersed In the plastic; and readily diffuse in the plastic.

The polymers containing the MI compounds are used to manufacture any of a number of articles, preferably ones that come In contact with foods such as foam containers and fruit shock absorber nets. Also intended are loose fill pellets.

In one embodiment of the invention, a biodegradable organic polymer composition for forming useful articles comprises a host polymer that has incorporated therein an effective amount of a MI compound that inhibits growth of microbes in or on the article formed with the composition during the useful life of the article, thereby retarding degradation of the composition and the article during its useful life. In a preferred embodiment, the host polymer includes starch.

The MI compound preferably has at least one of antifungal and antibacterial activity. The concentration of the MI compound is between about 0.001% and about 3% by weight in the polymer, more preferably between about 0.005% and about 1% by weight.

When the MI compound is In particulate form In the host polymer, the microbe-inhibiting inhibiting compound is in a solid phase at a concentration that is preferably between about 1.5 and about 1000 times the MI compound solid phase minimal inhibitory concentration, more preferably, between about 5 and about 300 times the MI compound solid phase minimal inhibitory concentration ("MIC").

When the MI compound is substantially in solution in the host polymer, the microbe-inhibiting compound is preferably at a concentration between about 1 and about 20 times the microbe-inhibiting compound's solid phase MIC, more preferably, between about 2 and about 20 times the MIC.

In the above composition, the host polymer preferably comprises a synthetic organic polymer, preferably one selected from the group consisting of polyethylene, polypropylene, a copolymer of ethylene and propylene, polystyrene, polyvinyl chloride, polyhydroxybutyrate, polyhydroxybutyrate blended with 3-hydroxyvaleric acid, polycaprolactone, a poly(amino acid), a polyanhydride, a poly (ortho ester), and a polyphosphazene.

When starch is included, it is preferably linked to the synthetic organic polymer by an organic linker group, preferably maleic anhydride.

In the above composition, the MI compound retards degradation partially or completely during storage of the article.

The MI compound above is preferably selected from the group consisting of diiodoethyl-p-tolylsulphone (DIMTS), triclosan, 10,10"-oxy-bis-phenoxarsin)); a tributyltin derivative Intercide™;(N-(trichloro copper-bis-(8-hydroxyquinoline); (N-tri 2-N-octyl-4-isothiazolin-3-one; a zinc complex of pyrithione termed Zinc Omadine; and silver hydroxyapatite. Preferred forms of triclosan are Irgasan DP™ or Ultrafresh NM-100™. The MI compound can be a cocktail of antimicrobial agents as in Bacticlean™

In a preferred starch-based composition, the synthetic polymer is maleated ethylene-propylene copolymer and the MI compound is DIMTS.

In another embodiment of the invention, an article of manufacture is formed from the biodegradable organic polymer compositions described above. The article can be molded or extruded. Preferably, the article is one which, in its normal use, contacts a food. Thus, the article can be selected from the group consisting of a foam food container or support, a shock absorber net, a loose-fill foam packing pellet, a cutlery or tableware article and a drinking cup. The article can also be selected from the group consisting of a loose-fill foamed packing pellet, a pet chewing article; a garbage bag and a golf tee.

In another embodiment of the invention, a method for retarding the undesired degradation of a biodegradable organic polymer composition that is optionally formed into a useful article comprises incorporating into the polymer an effective amount of a MI compound that inhibits growth of microbes in or on the composition or article. In this method, the polymer composition preferably Includes starch.

Still further according to the invention, a method of rendering a biodegradable organic polymer composition, or a useful article formed therefrom, resistant to microbial invasion, growth, proliferation or spread comprises incorporating into the organic polymer composition, preferably one that includes starch, an effective amount of a MI compound.

In the foregoing method, the MI compound can be in the form of a powder, a liquid concentrate or can be first incorporated or integrated into a resin carrier. Incorporation of the microbe-inhibiting compound into the polymer can be performed at the time of compounding the polymer or at the time of forming the article.

In this method, the MI compound can be in particulate form, wherein the incorporating comprises the steps of dry-mixing, heating and, optionally, further mixing the microbe-inhibiting compound and the polymer. The incorporating can comprise a step of extruding, processing in a mixer or milling in a rolling mill.

In a preferred method, the composition is formed by the steps of mixing: 100 parts of dry starch with 40 parts of maleated ethylene-propylene copolymer, to form a first mixture;

blending the first mixture with 4 parts of a carrier resin comprising 6% MIMTS in ethylene vinyl acetate, to form a second mixture; and mixing the second mixture in an internal hot mixer for 14 minutes at 180° C.

DETAILED DESCRIPTION

A microbe-inhibitory (MI) compound is one that inhibits the growth, proliferation, spread, of any of a number of microorganisms, most importantly fungi (especially mold and yeast) and bacteria as well as algae, protozoa and various microscopic parasitic organisms. The most preferred compounds act in a manner that is not selective for any particular organism, but rather are inhibitory to a broad spectrum of microbial agents. The microbe-inhibiting compound can act by any mechanism to inhibit growth of the organisms, whether biostatic or biocidal. The preferred compounds are not required to have a particular inherent level or threshold of activity to be useful in accordance with this invention. In general, the preferred MI compounds are not the highly selective antibiotics of the type used in human medicine.

One objective of incorporating the MI compound is to arrest partially or completely the biodegradation of the polymer material.

In some cases, it is desired that the degradable compositions of the present invention, particularly when formed into an article, resist degradation for a desired period of time.

preferably the useful life of the article. After that interval, it may be desirable for the composition to degrade at a rate it would have without the presence of the MI compound. In such cases, a preferable MI compound is one that that gradually becomes deactivated, either by its interaction with microbes or by its interaction with other environmental factors such as ambient water vapor. MI compounds that lose their activity over time are well-known in the art, and include some that are specifically described herein. In such cases, the quantity of the MI compound in the composition, and its spatial and temporal distribution within the article, combine with the characteristics of the use environment of the article to determine the effective rate of degradation and, thereby, the lifetime of the composition and article.

For large-scale waste disposal, it is often desired that polymer-based materials possess low incineration energy, meaning that they release comparatively little energy when they are combusted. Degradable materials, which often possess characteristically low bond energies, are good candidates as components in low-incineration energy materials. Such materials, however, are frequently susceptible to microbial degradation, and their useful life may therefore be unduly shortened as they are exposed to environmental sources of fungi or bacteria. For example, in a humid environment, molds may grow on a degradable material or degradable component of a composite material. This phenomena is frequently observed with starch-based plastics materials of the type the invention seeks to improve. An example of starch-based plastics materials is starch-based packing "peanuts" which may possess an unduly short shelf life in a warm and humid storage environment.

The present invention provides a means to arrest the potential for such undesired degradation by incorporating a MI compound into the starch-based (or other) polymer. One criterion for selection of such a compound is that it not add appreciably to the incineration energy of the final material.

A preferred MI compound is diiodomethyl-p-tolylsulphone ("DIMTS"). Paulus, W., *Microbicides for the Protection of Materials*, Chapman & Hall, 1993, which is hereby incorporated by reference, describes this and other biocidal and biostatic agents. This compound possesses a broad spectrum of anti-microbial activity, and is most active against fungi (including yeast) and algae. DIMTS is especially preferred in articles that may be partially or wholly digested or in cases where the article is In contact with materials which are to be digested.

DIMTS can cause yellowing in the final article, and if this is deemed unattractive, color suppressants can be added. DIMTS melts at about 157° C. It is relatively Insoluble in water (0.0001 g/L at 25° C.) Acetone (350 g/L at 25° C.) and ethanol (20 g/L at 25° C.) are preferred solvents. DIMTS is generally stable over a pH range of about 4–10. A preferred form of DIMTS is the product Ultrafresh UF-95™, available from Thomas Research Associates. The concentration of UF 95™ in the finished product should be between about 0.001% to 3%, preferably between about 0.01% and 1% by weight per cent. (Unless otherwise specified, all concentrations disclosed herein are given in weight %).

Triclosan (2,4,4"-trichloro-2-hydroxydiphenylether), another preferred MI compound, is sold by Ciba-Geigy under the trade name Irgasan DP-300™. It can be obtained as a crystalline powder or as a liquid concentrate. It is also available from Thomas Research Associates under the trade name Ultrafresh NM-100™ in a commercial form ready for compounding. Unmodified triclosan is insoluble in water: sparingly soluble in dilute alkali solution; and soluble in ethanol. It melts at about 60° C., and decomposes at about 285° C. It has an $LD_{50}$ oral toxicity of >5000 mg/kg for dogs. It is non-mutagenic, non-teratogenic and has good skin compatibility. Data for triclosan, along with that for many other MI agents, are given in Paulus, supra.

Ultrafresh NM-100™, a preferred form of triclosan, is added in quantities to achieve a final concentration in finished product between about 0.001% and 2%, preferably between about 0.004% and 0.3% by weight.

Bacticlean™ (Allied Resinous Products) is a preferred MI "cocktail," i.e., a combination of compounds that work together to create broad-spectrum protection against microbial growth. Bacticlean™ is particularly preferred when processing with polyolefins.

Other preferred MI compounds include Vinyzene™ (OBPA (10,10"-oxy-bis- phenoxarsin)); Intercide™ (a tributyltin derivative); Fungitrol™ (N-(trichloro Cunilate™ (copper-bis-(8-hydroxyquinoline); Vancide™ (N-tri Micro-Chek™ (2-N -octyl-4-isothiazolin-3-one); Zinc Omadine (a zinc complex of pyrithione); and Apacider™ (silver hydroxyapatite).

In many cases, consumers may prefer articles that include or have been treated with natural MI agents. Garlic and turmeric are preferred sources of such materials, e.g., in the form of extracts or concentrates, but other natural spices or additives known in the art can be used as well.

In a preferred embodiment, the MI compound in particulate form is dry-mixed with the host polymer to obtain a relatively homogeneous overall mixture. Subsequent heating and further mixing serve to intermix the materials on a still finer level, e.g., the MI compound should come to exist as a solution or as a fine dispersion in the host polymer. Further mixing and homogenization can occur via shearing processes that occur to varying degrees during subsequent extrusion or processing with mixers (e.g., Banbury mixer) or rolling mills (e.g., the two-roll mill). This material can then be formed into pellets or some other form suitable for use in forming the final article.

It is generally preferred first to form a resin in which the MI compound is highly concentrated. The final article can be formed simply by mixing this resin with the conventional resin (lacking the MI compound) just before molding. For example, the resins can be mixed in the hopper of an injection molding machine. In this case, the host (or carrier) material containing the concentrated MI agent preferably comprises material which is similar to, or otherwise compatible.with, at least one of the material (s) which are to comprise the final article. In any case, the carrier material is selected to be stable and not affect degradation or otherwise adversely affect any other important or desirable property of any material in the final article.

Because the concentration of the MI compound in the concentrated resin may far exceed that commonly used, the MI compound may be incompatible with the desired carrier material. For compatibility, the carrier material is often chosen to be, in large part, the same material as one of the base polymers of the final article. When the substances are incompatible, the MI agent will often be "rejected" by the carrier material, resulting, e.g., in "blooming." U.S. Pat. No. 4,789,692 (incorporated by reference) describes a method of incorporating very high concentrations of biocides into thermoplastic resins so that the biocides are highly stable (or "immobilized"). The method essentially involves forming a composite resin comprising one phase which is identical to that of the final article and another phase that is highly compatible with the MI compound, which compound can be highly concentrated in this latter phase.

Solubility and/or general compatibility of the MI compound in the host polymer are important. A MI compound that is highly soluble in the host polymer can be dispersed on a molecular scale resulting in a true homogeneous distribution. A MI compound that is poorly soluble in the host polymer can be dispersed as a particulate in that polymer. As used herein, "particulate" refers to any condensed or bonded phase which covers a spatial scale significantly greater than the microbe-inhibiting compound's molecular size. The term "particulate" does not imply any shape or aspect ratio of the particles (i.e., they are not required to be approximately spherical or to have an aspect ratio near one).

Again, because a MI compound does not always dissolve fully, it can exist as "clumps" or particulate form in the polymer. In such cases, the actual concentration of the MI compound will vary across the composition of polymer. The "effective concentration" of a MI agent is a concentration (by volume) that would be present in the polymer if the agent were fully dissolved and dispersed. Thus, for example, stating that a polymer has an effective MI compound concentration of 0.01% may indicate that the MI agent is dissolved uniformly at a volume concentration of 0.01% (v/v), or the MI compound is present in $1/100^{th}$ of the polymer volume (i.e., in the form of particles) at a concentration of 1% (v/v), whereas the remaining 99% of the polymer has no MI compound (0%), for example, because diffusion has not yet occurred.

Particulate Dispersion

Several factors must be considered when the MI agent exists as a dispersed particulate in the host polymer. If the particulate is highly stable, so that molecules do not diffuse into the host polymer, then the average distance between particles must not significantly exceed the typical size of the target microbes if the microbe-inhibiting compound is to be effective. If the particles are much further apart than the typical size of a microbial cell, then these organisms can gain a foothold in the unprotected polymer regions between particles.

The sizes of microbes varies depending upon the general class (including genus and species) of the microbe. For example, bacteria are in the $\mu$m range, fungi vary considerably in size and can be much larger than bacteria. Other microbes are, of course, considerably larger.

If the MI compound in particulate form is relatively unstable, then it is less important that the average distance between particles be smaller than the typical effective size of the target microbes. This is because the MI compound will diffuse into the inter-particle regions. The appropriate combination of parameters (e.g., particle size and inter-particle distance) for the dispersion are determined by:

The appropriate minimum-inhibitory-concentration ("MIC");

The effective partial solubility of the MI compound in the host polymer; and

The diffusivity of the MI compound In the host polymer.

"MIC" refers to the minimum concentration of a given agent that inhibits the growth of a particular microbe or a collection of different types of microbes. The MIC is typically determined by adding the MI compound at varying concentrations directly to growth medium into which the microbes are Inoculated. The lowest concentration of the microbe-inhibiting compound at which the microbes are unable to grow (or which achieves a set amount of inhibition) is taken as the MIC.

The preferred MI compound, diiodomethyl-p-tolylsulphone or DIMTS (e.g., Ultrafresh UF-95™) is particularly effective as an antifungal or anti-algal agent. Its MIC is about 50 mg/L against *Staphylococcus aureus* bacteria; >1 against *Pseudomonas aeruginosa* bacteria and about 5 mg/L against the fungus *Aspergillus niger*.

The MIC of triclosan (e.g., Irgasan™ from Ciby-Ceigy) has been measured as about 0.01 ppm against *S. aureus*; about 100 ppm for bacterium *P aeruginosa*; and about 100 ppm against *A. niger*.

Because MI agents tend to be more effective in solution than in a plastic, the MIC measured in solution can serve as a lower limit for the "in-plastic" or "solid-phase" MIC, which is an important measure for the present applications.

A first estimate of the solid phase MIC is generally taken to 10 times (or more) the measured solution-phase MIC. Provided there are no substantial deleterious effects, a multiple of even 100–1000-fold over the solution MIC is preferred.

The effective partial solubility is a measure of the tendency for an MI compound to detach or otherwise become dissociated from the particle in the polymer host. This solubility generally increases as the size of the particle decreases due to the fact that the chemical activity of a compound is greater when it comprises the concave region of a curved interface. The effect is described by the Kelvin equation, which, for the present purposes, can be expressed $$RT \ln\left(\frac{S}{S_o}\right) = \gamma V\left(\frac{1}{R_1} + \frac{1}{R_2}\right)$$

where S is the solubility of the microbe-inhibiting compound within the curved interface; $S_O$ is the solubility of the microbe-inhibiting compound at an uncurved interface; R is the ideal gas constant; T is the temperature; $\gamma$ is the agent-host polymer interfacial energy; V is the specific volume of the particulate agent; and $R_1$ and $R_2$ are the principal radii of curvature of the interface between the microbe-inhibiting compound and the host polymer. It should be noted that protuberances or sharp edges (such as square or irregular shapes) typically possess local regions of very small radii R and thus, potentially much larger local solubility.

The effect of particulate size and shape on solubility can be used to tailor the properties. For example, small and/or irregular particulate size and shape will generally favor dissemination of the MI compound into the host polymer. The diffusivity of the agent in the host material determines that rate at which the microbe-inhibiting inhibiting compound will spread into the host after detachment or dissociation from the particle. The effects of the effective solubility and the diffusivity are linked. The effective solubility determines the stable concentration of the MI compound just outside of the particulate region.

If the diffusivity is very small, then compound moves out from the particulate very slowly. The stable concentration can thus be maintained with very little concomitant transfer of compound from the particulate to the bulk of the host polymer ("diffusion-limited" case). If the diffusivity is large, then the microbe-inhibiting compound transferring from the particulate to the host polymer is rapidly moved away from the interface Into the polymer bulk. In this case, the transfer of compound from particulate to host material occurs as fast as the agent can detach dissociate from the particulate ("interface-controlled" case).

Diffusivity is also important for maintaining adequate concentration of the microbe-inhibiting compound (>MIC) at the exterior surfaces of the final article. If the MI agent is depleted from, or otherwise becomes detached from, such surfaces, the diffusivity governs the rate at which it is replaced from the interior.

Information for determining preferred combinations of parameters can be obtained from simple experiments in which one incorporates the agent into the polymer and then observes the spatially variant properties within the polymer. For such diagnostic purposes, it is usually preferred to incorporate a deliberately low concentration of the microbe-inhibiting compound. For example, for a powdered agent with low solubility in a thermoplastic host polymer (so that it forms a particulate), and where the article of manufacture will be formed by injection molding, the following type of measurement can be performed:

Obtain the base polymer material in particulate form.

Cold mix the polymer particulates and the MI agent (e.g., shake in a closed container).

Heat and blend the mixture in an intensive hot mixer, the effective temperature of which meets the following criteria:

exceeds the melting temperature of the MI agent;

is below the degradation temperature of the MI agent;

is below the degradation temperature of the host polymer;

is above the optimal processing temperature of the polymer.

Because of the heat which is often developed during the mixing process, it may be necessary to cool the mixer so that the material does not approach or exceed the degradation temperatures of the host polymer or of the MI agent.

After the mixing for the desired time, remove the material from the mixer.

View a piece in an optical microscope and attempt to identify the agent particulate.

If the particulate cannot be seen, section the plastic and view the sectioned surface. (For sectioning, it is often preferred first to freeze the polymer, e.g., cooling using liquid nitrogen or a dry-ice-ethanol solution. Subsequent fracture then typically yields clean, cross-sectional surfaces.)

If the particulate is not yet visible, use a higher-power microscope. If the particulate is still not visible, it may be necessary to use an electron microscope.

Record the typical sizes and Inter-particle distances for a large number (e.g., 25) of the particulates. The average size is designated as d and the average inter-particle distance as $\xi$.

Inoculate the appropriate surface (e.g., exterior or cross-section) of a piece of the plastic using a pre-prepared culture of representative microbes. Keep the other pieces in a bag at room temperature.

Incubate the inoculated piece at 37° C. for 24 hours (or whatever time is necessary for sufficient microbial growth).

Remove the sample from the incubator and examine under a microscope. One should see microbial growth punctuated by regions of less or no growth surrounding the particulates. The boundary of these regions corresponds to locations at which the (diffused) concentration of agent is approximately equal to the solid-phase MIC.

Measure and record the extent of these "zones of inhibition." The average extent of this zone-of-inhibition is designated "x."

Repeat for the other samples of agent-incorporated material, where the storage time prior to inoculation (i.e., the time allowed for diffusion at room temperature) increases in a graded manner (e.g. 5, 10, 20 hrs.).

As an approximate (and phenomenological) measure of the diffusivity, D, can be described by the following expression:

$$D \approx \frac{x^2}{2t}$$

where x is the measured (average) extent of the zone-of-inhlbitlon at time, t. If desired, more numerically precise measures of the diffusivity can be obtained by parameter fitting to more physically precise diffusion models. See, e.g., Crank, *The Mathematics of Diffusion*, for presentation of such models.

Different combinations of host material-MI compound will require different intervals and conditions to obtain parameters. Through such routine experimentation, one can readily identify the desired intervals and conditions needed for obtaining the desired parameters.

Mixing can be improved by using an extruder. For example, the MI compound in powdered form and the host polymer can be fed into the hopper of an extruder, and the desired compounded plastic obtained at the exit die. Alternatively, pre-hot-mixed composites of host and compound can be fed into the extruder.

For adequate microbial protection of the plastic, it is preferred that the following condition be satisfied, at least approximately:

$$\frac{\bar{\xi}}{\sqrt{2D\tau}} < 1$$

where $\tau$ is the minimum interval between the forming and the use of the finished article. The MI compound which has diffused between the time of compounding and the time of molding is rendered more uniform during the molding process, resulting in a non-zero background concentration of the agent in the final article; this has the effect of lessening the apparent solid-phase MIC.

The primary variable to be controlled by processing in this type of system is $\xi$.

For a particular given system, $\xi$ is altered primarily by altering the quantity of the agent added, the original size and shape of the powder particles of the agent as added and the nature and parameters of the mixing process.

The precise dependence of $\xi$ obtained empirically rather than theoretically, on the above factors can be complex. The magnitude of $\xi$ is usually decreased by:

Increasing the quantity of the agent;

Decreasing the particle size of the agent before it is first mixed with the host polymer or the host polymer precursor (many methods are known in the art); and Increasing the vigor (e.g., the magnitude of the shear rates, etc.) and/or the duration of the mixing/blending process.

The MI compound must be added to the polymer in a quantity which is effective for adequate inhibition of the growth of the target microbes. The minimum effective amount of the microbe-inhibiting compound is that amount which, if fully and homogeneously dissolved, would bring the total concentration up to the solid-phase MIC. If the agent forms an unstable particulate, then in practice, appreciably larger quantities should be added to the plastic. This is because a substantial amount of the microbe-inhibiting compound-will remain in a particulate phase over the useful life of the article. Thus for an inter-particulate region to possess a concentration which exceeds the solid-phase MIC, the total amount added must, on average, exceed substantially the solid-phase MIC, the degree depending on the particle size, the effective solubility (which is affected by the particle size) and the diffusivity. Once the solid-phase MIC has been determined, however, additional levels to be added should exceed the solid-phase MIC by a factor of about 1.5–1000, preferably about 5–300. It is acceptable that the MIC compound be present in regions of the host polymer at concentrations less than the solid-phase MIC provided that such regions are smaller than the microbes of interest.

If the microbe-inhibiting compound dissolves substantially or fully in the polymer, then the effective MI compound concentration must exceed the solid-phase MIC less dramatically than in the particulate case above. The concentration typically varies from the solid-phase MIC to about 20 times higher, preferably from about 2 to about 10 times the solid phase MIC.

It should be noted that during use, the MI agent frequently is lost from, or otherwise rendered inactive on, the surfaces of the finished article. This occurs by dissolution into, or otherwise adherence to, other bodies which contact the finished article. It can also occur as a result of the tendency of the MI agent to degrade with time, either alone or via interaction with microbes. It is therefore preferred to incorporate larger amounts of the MI compound than would be necessary for inhibition of microbial proliferation early in the lifetime of the finished article. The preferred degree of such overload to account for these processes typically increases with the surface-to-volume ratio of the finished article, the vigor with which the article is used, the degree of adhesion of the MI agent to the surface of the article, and with the tendency of the MI agent to become "de-activated" at the surface. A typical range for this overloading is about 10–200%, preferably about 30–80%. Such overloading is not considered to be a problem because (a) the preferred MI compounds are typically quite inexpensive at the concentrations employed, (b) preferred MI agents are frequently sufficiently non-toxic, and (c) their effects on other properties of the final polymer are often negligible at the concentrations necessary for adequate microbial protection.

In those cases where it is difficult to disperse the MI compound in the polymer, it is often preferred to incorporate the MI agent into a carrier in which the microbe-inhibiting compound is more readily dispersed. This carrier material or resin can then be blended with the primary host polymer by methods known in the art of compounding polymers for molding or extrusion. For example, U.S. Pat. No. 4,789,692, which is hereby incorporated by reference, describes methods for compounding solid resins containing high concentrations of biocides. These resins are intended to be blended with other base-polymer resins to result in a final polymer with increased compatibility with the MI compound.

Because degradable polymers often comprise a blend of polymeric materials, one can choose the optimum carrier for the group of constituent materials. For example, starch-based biodegradable polymers often comprise starch blended (reacted or non reacted) with polymers such as polyethylene. The MI agent can first be incorporated in the starch or in the polyethylene (or other polymer) raw materials prior to their mixing.

A variety of dispersion aids can be used to assist in the dispersion of particulate or powder additives in the polymers. These generally contain at least one functional group with affinity for the particulate or powder. If the affinity is particularly strong (e.g., forms a covalent bond), the aid is referred to as a "coupling agent."

If the MI agent is in liquid form (or if it can be readily transformed to, dispersed in, or dissolved in a liquid carrier), It is often preferred to incorporate a surfactant or dispersing agent directly into the liquid. The so-treated MI agent should then be more readily dispersed in the host polymer. Dispersing agents can also be used with solid phase MI agents.

Furthermore, the hydrophilic properties of some degradable materials contribute to their tendency to degrade. Such materials typically are at least partially soluble in water so that the process of degradation is hastened in a humid or wet environment. To arrest or slow further unwanted degradation, a surfactant or other surface-energy-lowering additive, well-known in the art, is incorporated into the MI compound-containing hydrophilic polymer.

It may be desired to impart MI properties to a polymer blend which contains two or more different polymeric materials which are not intermixed at a molecular level, i.e., , a phase-separated polymer. In such a case, the effective solubility is likely to vary from phase to phase. Thus, the MI compound can be particulate in one phase and fully dissolved in another. Its concentration in the 2 or more phases may vary. The microbe-inhibiting compound's concentration in one place can exceed the solid phase MIC while in a second phase it does not. This may be a problem only If the typical spatial extent of the phase having a sub-MIC concentration is appreciably greater than the typical size of the microbes of interest. If so, then one must increase the MI agent concentration in this phase. This is preferably achieved by increasing the overall loading level. An alternative method is to add a surfactant or other compatibilizing agent to the polymer composition.

Highly porous biodegradable materials are particularly benefited from the inclusion of MI compounds as disclosed herein. Their high internal surface areas promote water sorption and/or condensation, which in turn enhance susceptibility to invasion and growth of microbes, especially furigi. The Incorporation of an effective amount of a MI compound, preferably one that is most efficacious fungi, into the host polymer material prior to foaming, is preferred. For proper foaming, the polymer melt must be sufficiently fluid prior to the actual foaming step. One must therefore select an MI compound or a master batch/MI compound combination that does not adversely affect the rheological properties of the polymer melt under the conditions in which the melt is maintained just prior to foaming and during the foaming process.

It may be desired to use more than one type of MI agent, e.g., In multi-phase polymers where one or more of the phases tends to expel the MI agent. It is more commonly desired, however, because of the synergistic quality of MI agent "cocktails" (which again, are included in the term MI "agent" or "compound"). For example, U.S. Pat. No. 5,772, 640, hereby incorporated by reference, discloses incorporation of a synergistic combination of triclosan and chlorhexidine in the fabrication of polymeric medical articles.

It may be desired to use MI agent cocktails comprising several "narrow band" or highly-specific agents to "program" a highly specific inhibition spectrum into the polymer. The ability to program such specific inhibition spectra can be useful for a variety of diagnostic devices. For example, one can incorporate a spatially variant inhibition spectra on a plastic sheet. An unknown microbial culture can then be spread on the sheet, and, after a suitable Incubation, information regarding the microbial identity can be derived from the emerging spatial pattern.

As will be understood from the foregoing description, the amount of MI agent in the polymer mixture will vary over a wide range, depending on the MI agent, the polymer blend and the factors identified above. However, the amount of MI agent in the polymer blend will generally vary from 0.001% to 3%, preferably between 0.005% and 1%(by weight).

As mentioned earlier, it is important to ensure during processing or compounding that the degradation temperature of the MI agent is not exceeded. Because incorporation of the agent may lower the degradation temperature of the agent and/or of the host polymer, it is preferred, in the absence of specific information regarding the degradation of the composite material, to perform all processing and compounding substantially below the individual degradation temperatures. It is preferred to verify (e.g., by thermal and/or other methods known in the art) that the temperatures used have not exceeded actual composite degradation temperatures.

Although the invention has been described with respect to degradable plastics in which are incorporated agents to counteract in a controllable manner the natural susceptibility which these plastics have to harbor microbes and for microbially-enhanced degradation processes, the invention also relates to plastics which would not generally be described as degradable or as having a significant degradable component.

Having now generally described the invention, the same will be more readily understood through reference to the following examples which are provided by way of illustration, and are not intended to be limiting of the present invention, unless specified.

EXAMPLE I 50 gm of dry starch powder are mixed with 100 mg of triclosan powder and shaken in a closed container. The mixture is then further mixed with 15 gm of maleated ethylene-propylene copolymer pellets. This mixture is then mixed in an internal hot mixer for 12 minutes at 185° C. The resulting material can be used as raw material for molding or extruding desired articles.

EXAMPLE II

Ultrafresh NM-100™ (available from Thomas Research Associates) is incorporated at a concentration of 0.5% into polyethylene pellets and extruded and cut into small pellets. 20 gm of this mixture is mixed with 50 gm of a dry starch powder. This mixture is then mixed in an internal hot mixer for 12 minutes at 185° C. The resulting composition can be used as raw material for molding or extruding desired articles.

EXAMPLE III

Ultrafresh NM-100™ is incorporated at a concentration of 0.3% into polypropylene pellets and extruded and cut into small pellets. 25 gm of this material is mixed with 50 gm of a dry starch powder. This mixture is then mixed in an internal hot mixer for 12 minutes at 185° C. The resulting material can be used as raw material for molding or extruding desired articles.

Irgasan™DP300 (a triclosan material available from Ciba Specialty Chemicals) is incorporated at a concentration of 0.4% into a polypropylene pellets and extruded and cut into small pellets. 30 gm of this material is mixed with 50 gm of a dry starch powder. This mixture is then mixed in an internal hot mixer for 12 minutes at 185° C. The resulting material can be used as raw material for molding or extruding desired articles.

EXAMPLE V

Ultrafresh NM-100 ™ is blended at a concentration of 0.5% into polyethylene pellets and extruded and cut into small pellets. 20 gm of this material is mixed with 50 gm of a dry starch powder and with 3 gm of sorbitol. This mixture is then mixed in an internal hot mixer for 12 minutes at 185° C. The resulting material can be used as raw material for molding or extruding desired articles.

EXAMPLE VI

Ultrafresh NM-100™ is blended at a concentration of 0.5% with polyethylene pellets and extruded and cut into small pellets. 20 gm of this composition is mixed with 50 gm of a dry starch powder and with 3 gm of glycerol and 1 gm of table salt. This mixture is then mixed in an internal hot mixer for 12 minutes at 185° C. The resulting material can be used as raw material for molding or extruding desired articles. The resulting material is especially attractive for producing mastication articles for animals.

EXAMPLE VII

Ultrafresh NM-100™ is blended at a concentration of 0.5% with polyethylene pellets and extruded and cut into small pellets. 20 gm of this material is mixed with 50 gm of a dry starch powder and with 2 gm of glycerol, 2 gm of sorbitol, and 2 gm of fructose. This mixture is then mixed in an internal hot mixer for 12 minutes at 185° C. The resulting composition can be used as raw material for molding or extruding desired articles. The resulting material is especially attractive for producing mastication articles for animals.

EXAMPLE VIII 100 gm of dry starch are mixed with 40 gm of maleated ethylene-propylene copolymer pellets. This mixture is then blended with 4 gm of a carrier resin comprising 6% Ultrafresh UF-95 in ethylene vinyl acetate. This mixture is then mixed in an internal hot mixer for 14 minutes at 180° C. The resulting material can be used for molding into a degradable article possessing microbe-inhibiting qualities.

EXAMPLE IX

Ultrafresh UF-95™ is incorporated at a concentration 3% by weight into an ethylene vinyl acetate carrier resin which is processed to be in pellet form. 17 gm of this material is mixed with 105 gm of a dry starch powder and 78 grams of polypropylene. This mixture is then mixed in an internal hot mixer for 14 minutes at 180° C. composition can be used as raw material for molding a mastication article.

Reasonable variation and modification are possible within the foregoing disclosure without departing from the spirit of the invention which is described in the appended claims.

What is claimed is:

1. A formed body in the shape of a useful article comprising a biodegradable polymer composition including a host polymer that has incorporated therein an effective amount of a microbe-inhibiting compound or compounds which inhibit the growth of microbes in or on the useful articles, where the microbe-inhibiting compound or compounds are selected from the group consisting of diiodomethyl-p-tolylsulphone; 2,4,4'-trichloro-2-hydroxydiphenylether; 10,10-oxy-bis-phenoxarsin; N-trichloromethylthio-4-cyclohexene- 1,2-dicarboximide; a zinc complex of pyrithiione termed zinc omadine; silver hydroxyapatite; 2-N-octyl-4-isothiazolin-3-one; copper-bis-(8-hydroxyquinolline); N-(trichloromethyl-thio) phthalimide; and natural microbe-inhibiting compounds.

2. A formed body in the shape of a useful article according to claim 1 wherein said polymer composition comprises starch.

3. A formed body in the shape of a useful article according to claim 1 wherein said formed body is a foamed container.

4. A formed body in the shape of a useful article according to claim 1 wherein said formed body is a loose fill packing pellet.

5. A foamed body in the shape of a useful article comprising a biodegradable polymer composition including a matrix polymer containing a microbe-inhibiting compound or compounds which inhibit the growth of microbes in or on the useful articles, wherein the microbe-inhibiting compound or compounds are inhibiting to at least two classes of microbial agents selected form fungi, bacteria, algae, protozoa and microscopic parasitic organisms.

6. A foamed body in the shape of a useful article according to claim 5, wherein said polymer composition comprises starch.

7. A foamed body in the shape of a useful article according to claim 5, wherein said foamed body is a foamed container.

8. A foamed body in the shape of a useful article according to claim 5, wherein said foamed body is a loose fill packing pellet.

9. A foamed body formed in the shape of a useful article comprising biodegradable polymer composition comprising a host polymer that has incorporated therein an effective amount of a microbe-inhibiting compound that inhibits the growth of microbes in or on the articles, wherein the microbe-inhibiting compound is a cocktail of anti-microbial agents and where the polymer composition is formed into a foamed body.

10. A foamed body formed in the shape of a useful article according to claim 9 wherein the polymer composition comprises starch.

11. A foamed body formed in the shape of a useful article according to claim 9 wherein the foamed body is a foamed container.

12. A foamed body formed in the shape of a useful article according to claim 9 wherein the foamed body is a loose fill packing pellet.

13. An organic polymer composition for forming useful articles, comprising a host polymer that has incorporated therein an effective amount of a microbe-inhibiting compound that inhibits the growth of microbes in or an the articles, wherein the microbe-inhibiting compound is a cocktail of anti-microbial agents and where the organic polymer is selected from the group consisting of polyethylene, polypropylene, polystyrene and polyvinyl chloride.

14. A foamed body in the form of a useful article comprising the organic polymer composition of claim 13.

15. A foamed body in the form of a useful article according to claim 14 wherein the foamed body is a food-contacting body.

16. An organic polymer composition for forming useful articles, comprising a host polymer that has incorporated therein an effective amount of a microbe-inhibiting compound that inhibits the growth of microbes in or on the articles, wherein the microbe-inhibiting compound is a cocktail of anti-microbial agents and wherein the polymer composition is a polymer blend.

17. An organic polymer composition for forming useful articles, comprising a matrix polymer containing a microbe-inhibiting compound or compounds which inhibit the growth of microbes in or on the useful articles, where the microbe-inhibiting compound or compounds are inhibiting to at least two classes of microbial agents selected from fungi, bacteria, algae, protozoa and microscopic parasitic organisms, and where the organic polymer comprises a polymer selected from the group consisting of polyethylene, polypropylene, polystyrene and polyvinyl chloride.

18. A foamed body in the form of a useful article comprising the organic polymer composition of claim 17.

19. A foamed body according to claim 18 wherein the foamed body is a food-contacting body.

20. An organic polymer composition for forming useful articles, comprising a matrix polymer containing a microbe-inhibiting compound or compounds which inhibit the growth of microbes in or on the useful articles, wherein the microbe-inhibiting compound or compounds are inhibiting to at least two classes of microbial agents selected from fungi, bacteria, algae, protozoa and microscopic parasitic organisms, and where the polymer composition is a polymer blend.

21. A biodegradable polymer composition for forming useful articles, comprising a host polymer that has incorporated therein an effective amount of a microbe-inhibiting compound or compounds which inhibit the growth of microbes in or on the useful articles, where the microbe-inhibiting compound or compounds are selected from the group consisting of dliodomethyl-p-tolylsulphone; 2,4,4'-trichloro-2-hydroxydiphenylether; 10,10-oxy-bis-phenouarsin; N -trichloromethylthio-4-cyclohexene-1,2-dicarboximide; a zinc complex of pyrithiione termed zinc omadine; silver hydroxyapatite; 2-N-octyl-4-isothiazolin-3-one; copper-bis-(8-hydroxyquinolline); N-(trichloromethyl-thio) phthalimide; and natural microbe-inhibiting compounds, and where the polymer comprises a polymer selected from the group consisting of polyethylene, polypropylene, polystyrene and polyvinyl chloride.

22. A foamed body in the form of a useful article comprising the biodegradable polymer composition of claim 21.

23. A foamed body according to claim 22 wherein the foamed body is a food -contacting body.

* * * * *